United States Patent Office 3,360,388
Patented Dec. 26, 1967

3,360,388
REFRACTORY
Joseph E. Neely, Los Gatos, Calif., assignor to Kaiser Aluminum & Chemical Corporation, Oakland, Calif., a corporation of Delaware
No Drawing. Filed May 3, 1965, Ser. No. 452,899
5 Claims. (Cl. 106—60)

This invention concerns refractory compositions, and more particularly it relates to refractory compositions containing finely divided magnesia.

While the primary concern with properties of refractory compositions is directed to their characteristics at elevated temperatures, for example high temperature strength, the behavior of such compositions prior to the time they reach their operating temperature, for example their hydration resistance during storage and during heatup of a furnace in which they are placed, and even the manner in which they behave during a forming operation, for example during placement in a furnace structure, are of great practical importance.

It has been found that hydration of a composition containing, together with refractory aggregate, finely divided dead burned magnesia or periclase and sodium silicate binder, is inhibited, with simultaneous prevention of deterioration of its refractory properties, particularly strength at intermediate temperatures, by incorporating in such composition an inorganic, alkali metal compound of boric acid, preferably an anhydrous compound, as is more fully set forth in application Ser. No. 106,180 by Van Dreser et al., filed April 28, 1961, now Patent 3,257,-217, issued June 21, 1966, and assigned to the assignee of the present invention.

While the above-mentioned compositions show good strength and good hydration resistance, they do not exhibit, under some conditions, the expected strength properties in use, for example in repairing the bottom of an open-hearth furnace. These unsatisfactory results are particularly apparent when the compositions are mixed with water and used as a "shovel" mix, as opposed to a gunning or ramming mix, a shovel mix being first mixed with water outside the furnace prior to being placed in a furnace, for example in the hearth or tap hole of an open-hearth steelmaking furnace, by throwing.

After extensive investigation, it was discovered that the poor strength characteristics obtained with the prior art compositions under certain conditions were due to too short a setting time of the room temperature bond or cement in the composition.

It has now been found according to this invention that this problem is overcome by a refractory composition consisting essentially of from 10 to 50% by weight finely divided magnesia, from 0.5 to 6% by weight sodium silicate, and from 0.25% to 3% by weight, calculated as $B_2O_3$, of a fully hydrated alkali metal borate, the balance of the composition being refractory grain.

In addition to the ingredients mentioned above, the composition can also contain up to 15% by weight of a high temperature or ceramic bonding material, sometimes referred to as a flux. Desirably, such material will be insoluble and non-reactive at room temperature. A preferred ceramic bonding material is iron oxide, for example in the form of millscale. When the ceramic bonding material is iron oxide, the iron oxide will be present in an amount no greater than that sufficient to react with all the finely divided magnesia present to form magnesium ferrite ($MgFe_2O_4$).

The fine magnesia, which contributes to the high temperature or ceramic bond, can be deadburned magnesite or periclase formed from the high temperature calcination or burning of magnesium hydroxide, such as that formed by the reaction of dolomite with seawater or inland brines containing magnesium chloride ($MgCl_2$). The finely divided magnesia will be of a size such that substantially all passes a 100 mesh screen.

The sodium silicate can be any of various materials of differing $Na_2O:SiO_2$ ratio, but preferably has a $Na_2O:SiO_2$ ratio of from 1:1 to 1:3, a particularly preferred material being that sodium silicate with a $Na_2O:SiO_2$ ratio of 1:2. The sodium silicate can be either anhydrous or hydrated, but will generally be used in solid, as opposed to liquid or solution, form when making a refractory composition which is intended to be shipped to the place of use and there mixed with water prior to placement in a furnace.

The hydrated alkali metal borate can be any such material, hydrated sodium borates being generally more available than such materials as potassium, lithium, and ammonium borates.

The refractory grain used in the composition of this invention can be any refractory grain. However, finely divided magnesia is used as a ceramic bond for nonacid metal oxide refractories such as magnesia, chromite, magnesium aluminate spinel, and the like and admixtures of two or more of these with each other.

*Example I*

As an illustrative but non-limiting example of the practice of this invention, a composition was made consisting of 88.6 parts by weight of a periclase having the following typical chemical analysis: 3.20% $SiO_2$, 1.15% CaO, 0.45% $Fe_2O_3$, 0.35% $Al_2O_3$, 0.30% $B_2O_3$, and 94.55% MgO (by difference); 7.5 parts millscale; 2.0 parts sodium silicate having a $Na_2O:SiO_2$ ratio of 2:1; and 1.9 parts sodium tetraborate decahydrate ($Na_2B_4O_7 \cdot 10H_2O$). The periclase grain all passed a 4 mesh screen, 28.7 parts passing a 100 mesh screen and 20 parts passing a 325 mesh screen. The millscale was substantially all iron oxide having trace amounts of $SiO_2$, $Al_2O_3$, CaO, and MgO as impurities; all the millscale passed a 100 mesh screen and the major portion of it passed at 325 mesh screen. The hydrated borax all passed a 10 mesh screen and 80% passed a 100 mesh screen.

The above composition according to this invention is to be compared with a prior art composition containing the same amounts of millscale and the same sodium silicate, but 1 part anhydrous borax ($Na_2B_4O_7$) and a correspondingly greater amount, 89.5 parts, of periclase grain.

When both the new and old compositions were mixed with 8% by weight water and formed into test specimens, both showed essentially identical bulk density, cold crushing strength, hydration resistance, hot load failure temperature, and volume change after firing to 1350° C. and 1650° C. properties.

However, when the above two compositions were tested for workability of the mix formed upon adding 8% water by determining the ease of penetration by a pointed needle, it was found that 10 minutes after the addition of the water the prior art mix had stiffened considerably and was difficult to penetrate with the pointed needle; 40 minutes after mixing with water, the prior art composition had set and could not be penetrated with the pointed needle. On the other hand, the composition according to this invention remained essentially in its as-mixed condition, being easily penetrated by the pointed needle for a period of 50 minutes, when it began to stiffen slightly and present slight resistance to the penetration of the needle. It was not until after 150 minutes had elapsed from the time of mixing that the mix according to this invention showed considerable stiffening and became difficult to penetrate with the pointed needle.

In a practical test of the behavior of the composition of Example I under conditions simulating the placement of the mix in a furnace by a shovel, the composition immediately after mixing with 7.5% water appeared wet but not fluid and felt sticky. Upon shoveling, it left the shovel easily with only a little sticking or pulling. The shoveled material stayed together well in transit and meshed in very well at the target. The same composition, 1½ hours after the first shoveling test, showed the same behavior properties in a repeated shoveling test. On the other hand, the composition according to the prior art, when mixed with 8.0% water, while showing the same good handling properties immediately after mixing, had, by the time 1½ hours after the first shoveling had elapsed, set up so that it could not be shoveled.

In the specification and claims, percentages and parts are by weight unless otherwise indicated. Mesh sizes referred to herein are Tyler standard screen sizes which are defined in Chemical Engineers' Handbook, John H. Perry, Editor-in-Chief, third edition, 1950, published by McGraw-Hill Book Company, at page 963. For example, a size passing a 100 mesh screen corresponds to 147 microns, and that passing 200 mesh, to 74 microns. Analyses of mineral components are reported in the usual manner, expressed as simple oxides e.g., MgO, SiO$_2$, although the components may actually be present in various combinations, e.g., as a magnesium silicate. The term "magnesia" is intended to include periclase, deadburned magnesia, and deadburned magnesite from various sources, and to include especially any such deadburned product containing at least 65% magnesium oxide.

Having now described the invention, what is claimed is:

1. A refractory composition adapted for use as a shovel mix consisting essentially of: from 0.5% to 6% by weight sodium silicate; from 0.25% to 3% by weight calculated as B$_2$O$_3$, of sodium tetraborate decahydrate; from 10% to 50% by weight finely divided magnesia; from 0 to 15% by weight of a ceramic bonding material; the balance of the composition being refractory grain.

2. A refractory composition according to claim 1 wherein said sodium silicate has a Na$_2$O:SiO$_2$ ratio of from 1:1 to 1:3, and said ceramic bonding material is iron oxide in an amount no greater than that required to react with all the finely divided magnesia present to form magnesium ferrite.

3. A refractory composition according to claim 2 wherein said sodium silicate has a Na$_2$O:SiO$_2$ ratio of about 1:2.

4. A refractory composition according to claim 2 wherein said iron oxide is millscale.

5. A refractory composition adapted for use as a shovel mix consisting essentially of about 89.5 parts by weight periclase, about 28.7 parts of said periclase passing a 100 mesh screen, about 7.5 parts millscale, about 2 parts sodium silicate, and about 1.9 parts sodium tetraborate decahydrate.

References Cited

UNITED STATES PATENTS

| | | | |
|---|---|---|---|
| 3,257,217 | 6/1966 | Van Dreser et al. | 106—58 |
| 2,702,751 | 2/1955 | Austin et al. | 106—59 |
| 2,999,759 | 9/1961 | Heuer | 106—59 |
| 3,036,925 | 5/1962 | Heuer | 106—59 |

TOBIAS E. LEVOW, *Primary Examiner.*

HELEN M. McCARTHY, JAMES E. POER,
*Examiners.*